(12) United States Patent
Nunke

(10) Patent No.: US 7,763,091 B1
(45) Date of Patent: Jul. 27, 2010

(54) DISTRIBUTED VACUUM DEBRIS COLLECTOR

(76) Inventor: Edward J. Nunke, P.O. Box 280, Maple Lake, MN (US) 55358

( * ) Notice: Subject to any disclaimer, the term of this patent is extended or adjusted under 35 U.S.C. 154(b) by 157 days.

(21) Appl. No.: 12/242,891

(22) Filed: Sep. 30, 2008

(51) Int. Cl.
*B01D 51/00* (2006.01)

(52) U.S. Cl. .............. 55/467; 55/471; 55/472; 55/418; 55/356; 55/511; 15/350; 15/352; 15/415.1; 15/419; 15/300.1; 15/312; 15/314; 210/206

(58) Field of Classification Search .......... 55/467, 55/471, 472, 418, 356, 511; 15/350, 352, 15/353, 415.1, 419, 300.1, 312, 314; 454/49–67; 210/206
See application file for complete search history.

(56) References Cited

U.S. PATENT DOCUMENTS

| | | | |
|---|---|---|---|
| 2,247,891 A | 7/1941 | Schneible | |
| 2,292,665 A | 8/1942 | Schneible | |
| 2,499,933 A | 3/1950 | Smul | |
| 2,565,510 A | 8/1951 | Martin | |
| 2,667,017 A | 1/1954 | Robert | |
| 3,525,183 A | 8/1970 | Gargrave | |
| 3,708,824 A * | 1/1973 | Holubinka | 15/397 |
| 3,771,193 A * | 11/1973 | Hageal | 15/397 |
| 3,945,281 A | 3/1976 | Kreitz | |
| 4,279,057 A * | 7/1981 | Restivo | 15/415.1 |
| 4,759,155 A | 7/1988 | Shaw | |
| 5,057,127 A * | 10/1991 | Lange et al. | 95/273 |
| 5,074,198 A | 12/1991 | Aalto et al. | |
| 5,125,190 A | 6/1992 | Buser et al. | |
| 5,220,753 A | 6/1993 | Whitman | |
| 5,594,972 A | 1/1997 | Iversen | |
| 5,659,923 A * | 8/1997 | Coombs | 15/398 |
| 5,931,072 A | 8/1999 | Shibata | |
| 5,941,766 A | 8/1999 | Iversen | |
| 6,159,086 A | 12/2000 | McClurkin | |
| 6,237,186 B1 * | 5/2001 | Griffiths | 15/319 |
| 6,266,892 B1 * | 7/2001 | Haynie | 34/84 |
| 6,513,192 B1 * | 2/2003 | Pearlstein | 15/415.1 |
| 6,783,563 B1 * | 8/2004 | Eckhoff et al. | 55/356 |
| 7,189,272 B2 | 3/2007 | Cheng | |
| 2004/0011749 A1 * | 1/2004 | Hutchinson et al. | 210/808 |
| 2008/0196198 A1 * | 8/2008 | Labarbera et al. | 15/415.1 |
| 2008/0263812 A1 * | 10/2008 | Williams et al. | 15/322 |

* cited by examiner

*Primary Examiner*—Jason M Greene
*Assistant Examiner*—Dung Bui
(74) *Attorney, Agent, or Firm*—Albert W. Watkins

(57) ABSTRACT

A dust collector has a vacuum coupling for connection to a vacuum source such as a portable vacuum cleaner or other suitable source. A vacuum reservoir is formed from a chamber between nested interlocking receptacles. A variable density pattern of inlet holes through one interlocking container into the vacuum reservoir provides better flow and capture of debris, while multiple inlets within the vacuum reservoir provide even and consistent suction. A variety of inlet geometries are presented that are suitable to a variety of purposes.

18 Claims, 12 Drawing Sheets

DISTRIBUTED VACUUM DEBRIS COLLECTOR

BACKGROUND OF THE INVENTION

1. Field of the Invention

This invention pertains generally to the field of debris collection, and more specifically to a collector for airborne debris.

2. Description of the Related Art

Portable power tools greatly facilitate many tasks, including both fabrication and repair. For exemplary purposes, a power hand grinder may be used to remove material or cut through metal in a very small fraction of the time required to complete the same task manually. The particular power source used to power the tool is not important for the present invention, and is known to include such diverse sources as compressed air, electricity, internal combustion engines, and other suitable sources.

These portable power tools have been devised for many tasks, some which are known to rapidly expel large amounts of fine debris into the air. Exemplary processes are abrasive, such as sanding and grinding operations, though there are other operations as well which release debris into the air. In addition, there exist a number of additional procedures and processes that do not use power tools, but which also produce undesirable airborne particulates. Exemplary of such additional processes are painting and particulate blasting, both which often also produce fine particulate airborne contaminants.

These particles can remain suspended in the air momentarily, or even for relatively substantial time periods, depending upon the particle size and composition, and air currents. These particles, sometimes referred to as particulates, literally create a dust cloud. Even after settling out of the air onto surfaces, the fine particles are readily disturbed and re-introduced into the air, such as by a breeze through an open door or window, by movement of a person or work object, or by another work process.

Such dust can be inhaled or settle on the skin, causing irritation or constituting a respiratory and/or health hazard for individuals in the immediate vicinity. Exposure to dust in coal mines has long been known to result in black lung disease, and more recently exposure to asbestos, silica, and other compounds has also been directly linked to specific diseases and morbidity or mortality. Furthermore, such dust can accumulate on tools, causing premature aging and failure of the tools, and on surfaces such as work areas or objects being worked upon, potentially contaminating work areas or disturbing the appearance of the work. For exemplary purposes, dust produced in an automotive repair shop from grinding, brushing, or other similar processes may foul the air within the shop. Not only will the shop workers be undesirably exposed to the dust, the automobiles being repaired will likewise be coated with the dust.

Currently, the problem of power tool and similar dust is handled in several different ways. One such approach is to create a ventilated space, as in U.S. Pat. Nos. 2,247,891 and 2,292,665 by Schneible, entitled "Ventilating Apparatus." This system provides directed, relatively even or laminar flow across an open space such as a room or chamber. To be beneficial, the work operation must be conducted within the room or chamber. As will be apparent, one benefit of portable tools is the ability to bring the tool to the work. The work desirably may not be within a predetermined room or chamber.

A similar approach is to use a dust hood for machines, a variety of which are illustrated in U.S. Pat. Nos. 2,565,510 by Martin, entitled "Dust Collector for Tile Cutting Machines and the Like"; 2,667,017 by Jaron, entitled "Dust Collector Hood Construction"; 3,945,281 by Kreitz, entitled "Dust Collector for Radial Arm Saws"; 5,074,198 by Aalto et al, entitled "Focussed Ventilation Procedure for a Work Spot and Apparatus Used in the Procedure"; 5,594,972 and 5,941,766 by Iversen, entitled "Dust Collector" and 6,159,086 by McClurkin, entitled "Dust Collecting Work Station." These relatively large hoods interfere with the portable nature of the tool, and prevent all but the most basic of manipulation. As a result, these collectors are found almost exclusively only on "bench" machines which are affixed to the bench or another stand, and are therefore not hand-manipulable except through basic, predetermined movements. In addition, the prior art has not adequately controlled air flow in these large hoods, resulting in a large portion of the hood being prone to particulates bouncing off of or otherwise escaping from the hood.

Others yet have chosen to go straight to the source and have implemented vacuums into tools. Exemplary of these are U.S. Pat. Nos. 2,499,933 by Smul, entitled "Surface Cleaning Attachment"; 4,759,155 by Shaw, entitled "Particle Collecting Sander"; 5,125,190 by Buser et al, entitled "Dust Collector and Shield for Rotary Grinder"; 5,220,753 by Whitman, entitled "Safety Vacuum Shield for Flexible Cable and Motor Tool"; and 5,931,072 by Shibata, entitled "Circular Saw with an Improved Dust Collector". These dust collectors suffer from two opposing challenges. The first challenge arises from the operating speed of the machine or tool. Fine dust which remains suspended for long time periods is often produced by abrasive machines which operate at higher speeds. Unfortunately, this also means that the particles ejected therefrom are ejected at great velocities, and may be entrained in a high velocity air stream produced by the abrasive tool. To be effective, the vacuum must draw this air or particulate stream into an inlet. Unfortunately, the exact direction of the stream is often dependent upon the angle of contact between tool and work. Consequently, a larger collector is desirable to ensure collection of the high velocity stream being emitted from the work.

The second challenge arises when the tool is portable. The dust collector necessarily interferes with the portable nature of the tool. This interference arises from the additional bulk required for the collector, but perhaps more importantly, also arises from a desire for efficiency of collection to couple the collector to a vacuum source. This additional hosing can greatly interfere with proficient manipulation of the tool. Consequently, it is desirable to produce a smaller, more compact dust collector that is uncoupled from any other device to maintain the portable nature of the tool. A small collector is less likely to capture particulate, and, without a hose coupled to a vacuum source, a collection bag or the like blocks flow and rapidly clogs. Trying to maintain a small, uncoupled dust collector necessarily renders the dust collector substantially less effective than is desirable for most work environments. These collectors are useful and beneficial, but not adequate for most work environments.

U.S. Pat. Nos. 3,525,183 by Gargrave, entitled "Dust Collector" and 7,189,272 by Cheng, entitled "Movable Spray Painting Stand" illustrate portable dust collectors, enabling use in any variety of work spaces and with a variety of tools or particulate generators. While more universal, these patents suffer from the drawbacks associated with the tool-specific hoods described herein above.

Each of the foregoing patents are incorporated herein by reference for their illustrations and teachings relevant to the present invention, though they each lack certain deficiencies found in the present invention that are desirable in the art and enumerated herein below. Webster's New Universal Unabridged Dictionary, Second Edition copyright 1983, is additionally incorporated herein by reference in entirety for the definitions of words and terms used herein.

SUMMARY OF THE INVENTION

In a first manifestation, the invention is a distributed vacuum debris collector. A vacuum coupling connects to a vacuum source. A vacuum reservoir couples through the vacuum coupling to vacuum source, and has a cupped body defined by a solid base, an inlet base spaced therefrom, and side walls rising normal from the inlet base. The solid base and inlet base define a chamber therebetween for containing vacuum. Inlet holes pass through the vacuum reservoir inlet base to form the primary inlet into the chamber. The inlet holes have a variable density pattern with more inlet hole area per unit surface area adjacent to the side walls than at a center more distal from the side walls.

In a second manifestation, the invention is a vacuum debris collector having distributed vacuum coupling to a vacuum source. A vacuum coupling connects to a vacuum source. A first cupped interlocking container has sidewalls circumscribing an air space, an opening adjacent a first termination of the sidewalls and a solid bottom distal to the opening. A second cupped interlocking container nests within the first interlocking container and has sidewalls circumscribing an air space, an opening adjacent a first termination of the sidewalls and a perforated bottom distal to the opening. A vacuum reservoir is defined by the first interlocking container solid bottom, side walls and second interlocking container perforated bottom. Inlet holes pass through the perforated bottom into the vacuum reservoir. A plurality of inlets within the vacuum reservoir are coupled through the vacuum coupling to the vacuum source for even and consistent suction.

In a third manifestation, the invention is a portable vacuum debris collector. A portable vacuum source has a vacuum hose inlet. A vacuum reservoir has inlet holes for receiving a fluid stream with debris into the vacuum reservoir. A rigid vacuum coupling is inserted into and extends parallel with the vacuum hose inlet and extends vertically therefrom. The rigid vacuum coupling couples the vacuum reservoir to vacuum source and conveys the fluid stream with debris therebetween while simultaneously suspending the vacuum reservoir from the portable vacuum source.

OBJECTS OF THE INVENTION

Exemplary embodiments of the present invention solve inadequacies of the prior art by providing a dust collector having a vacuum coupling for connection to a vacuum source such as a portable vacuum cleaner or other suitable source, a vacuum reservoir, variable density patterns of inlet holes into the vacuum reservoir, multiple inlets within the vacuum reservoir for even and consistent suction, and a variety of inlet geometries suitable to a variety of purposes.

A first object of the invention is to provide a low-cost and easy coupling to an existing or custom vacuum source. A second object of the invention is to enable the coupling to be sufficiently compact and lightweight to be portable, while offering mounting options for also fixing the collector in location, depending only upon the particular needs of a user. Another object of the present invention is optimal air flow within an inlet region to enhance the capture of airborne particulates across the entire surface of the collector. A further object of the invention is to increase the effective capture area of the collector sufficiently to enable the collector to be spaced from and physically uncoupled from a particulate generator, thereby permitting free and independent motion of the particulate generator, while ensuring variations in direction of particulate stream will be captured. Yet another object of the present invention is to provide a flow path and couplings which are robust and not easily clogged or impeded.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 1:
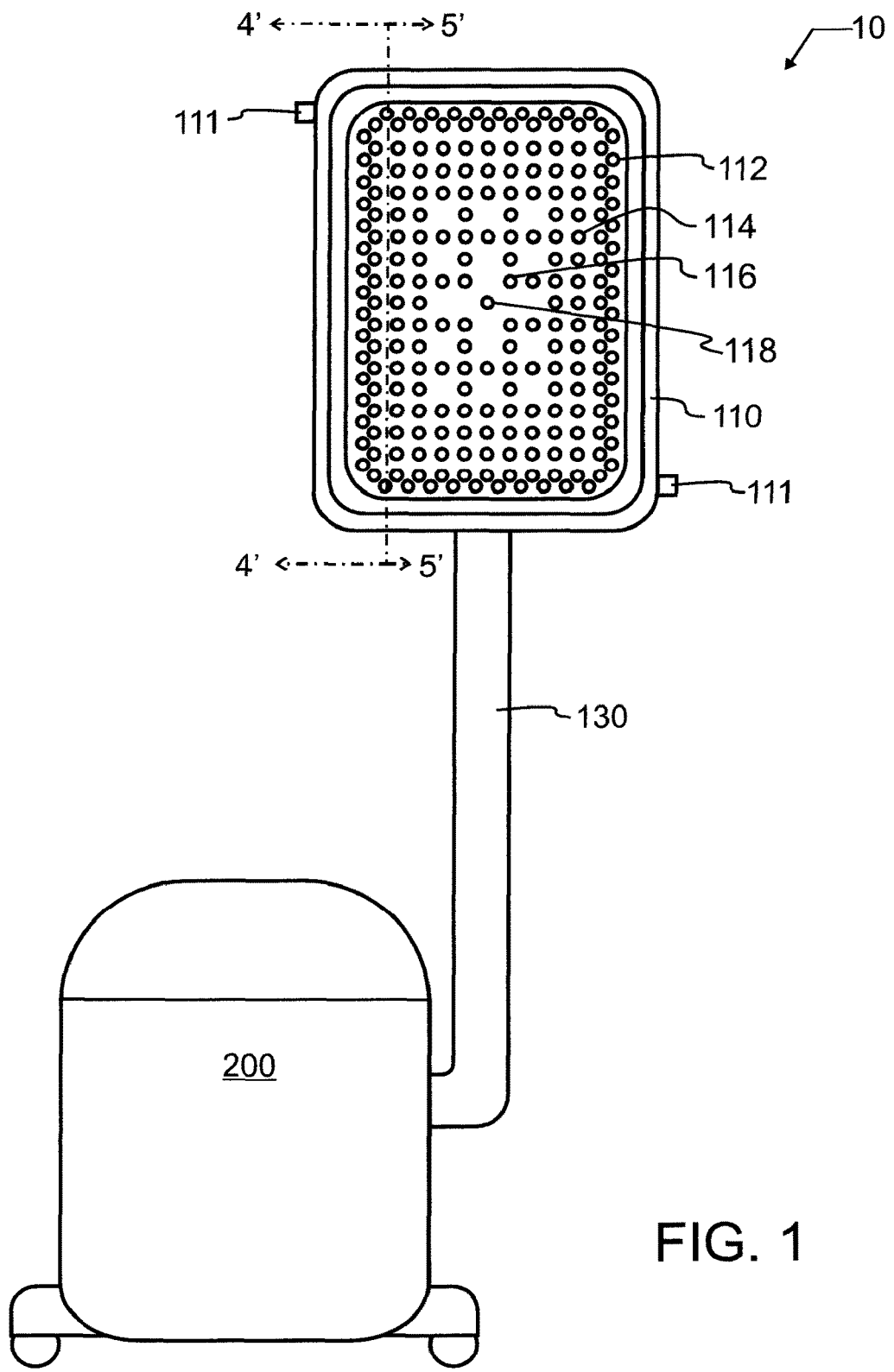
FIG. 1 illustrates a preferred embodiment of the invention in a most preferred combination with a vacuum source from front view.

Manifested in the preferred embodiment, the present invention provides a readily transportable distributed vacuum debris collector 10. In a most preferred embodiment of the invention illustrated in FIGS. 1 and 2, distributed vacuum debris collector 10 is comprised of interlocking containers 110, 120 with inlet suction holes 112, 114, 116, 118 attached to a vacuum or suctioning device 200 via attachment arm 130. Suctioning device 200 may be any suitable source of vacuum or suction, and so for exemplary purposes, but not solely limited thereto, portable vacuum cleaners, central vacuum systems, vacuum fans or blowers, or any other suitable source which will draw sufficient volume and vacuum pressure may be incorporated. While not critical to proper operation, in preferred embodiment distributed vacuum debris collector 10 the attachment arm 130 is rigid, and angled to extend vertically from suctioning device 200. Where suctioning device 200 is a vacuum cleaner, such as a prior art portable vacuum cleaner as illustrated, the inlet may not be parallel to the ground, but may instead be offset therefrom. In such case, it is preferably that attachment arm 130 not form a ninety degree angle between distributed vacuum debris collector 10 and suctioning device 200, but instead form an appropriate angle to result in the vertical orientation of distributed vacuum debris collector 10. Wile the preferred embodiment illustrates only a single angle in attachment arm 130, this single angle may alternatively be subdivided into a plurality of angles, or additional angles may be provided along attachment arm 130, depending upon a designer's desired placement of distributed vacuum debris collector 10 relative to suctioning device 200. More sharp angles are undesirable, since each angle will produce a finite and undesirable amount of turbulence and flow resistance, but such angles may be appropriate for a given application.

Figure 2:
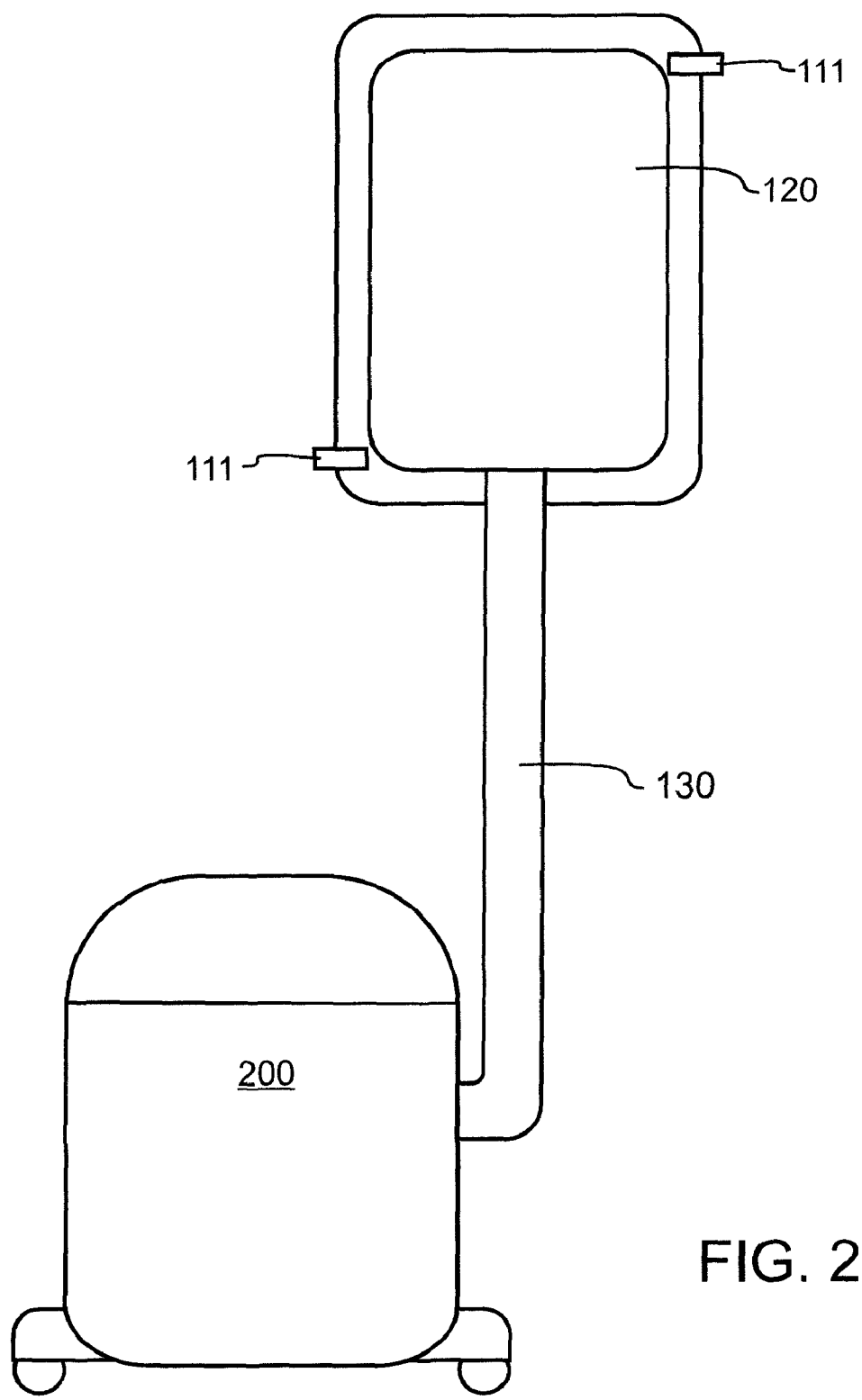
FIG. 2 illustrates the preferred embodiment of the invention of FIG. 1, but with the debris collector rotated to illustrate a back view of the preferred embodiment debris collector.

One or more wall mounting tabs 111 may optionally be provided adjacent the back surface of interlocking container 120, as illustrated in FIG. 2. Wall mounting tabs 111 provide the option for fixed location mounting, in instances where a user will prefer semi-permanent placement. In these instances, attachment arm 130 may be either rigid or flexible, and may optionally also be coupled with suitable hardware to a wall or the like.

Figure 3:
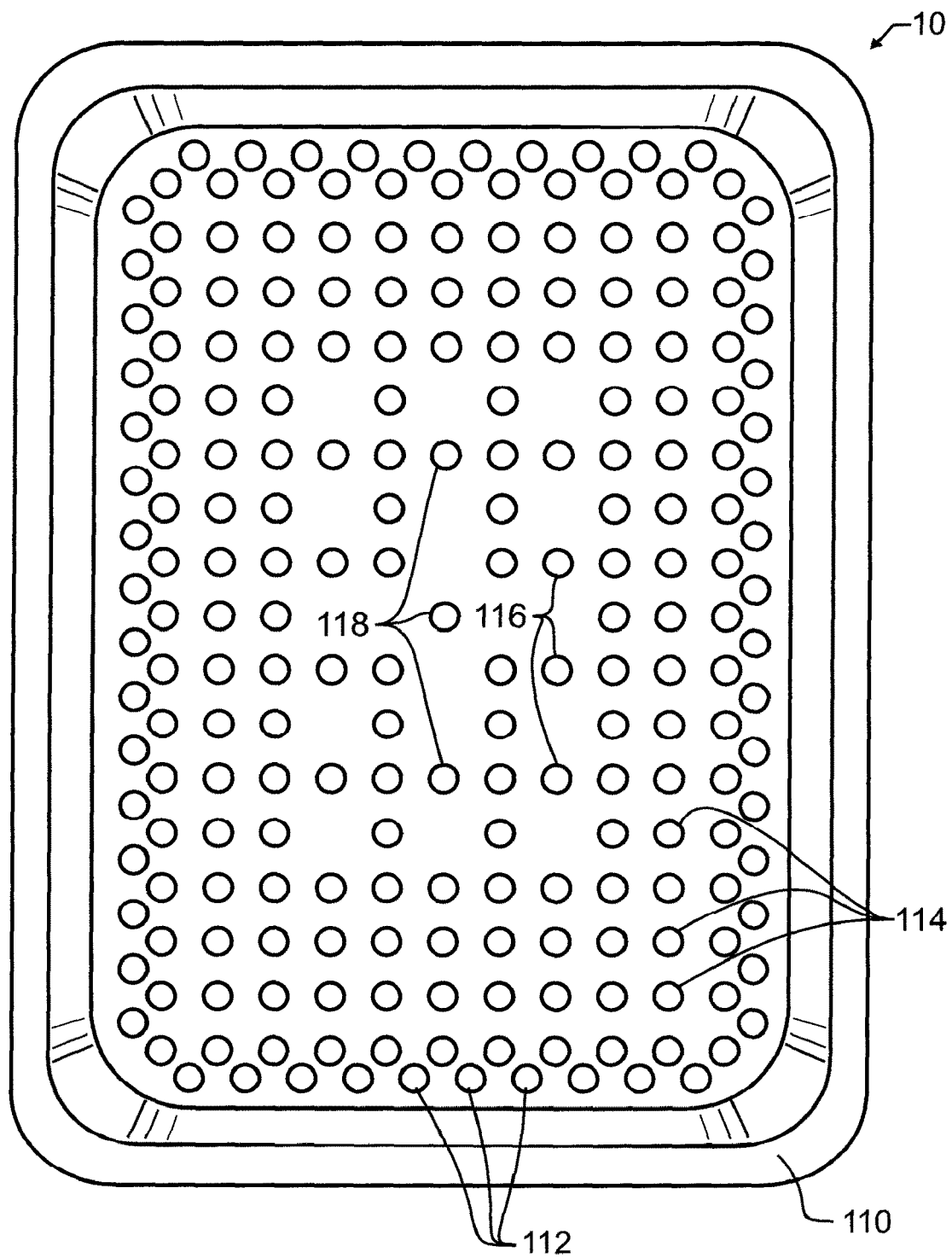
FIG. 3 illustrates the most preferred embodiment debris collector inlet face, providing an enlarged view of the suction hole density patterns from front view.

As can be seen in FIG. 3, suction holes 112, 114, 116, 118 are most preferably arranged in a density pattern that varies with distance from the outer perimeter. Suction holes 112 are located around the edges and with the highest density. This high density arrangement assists with the drawing of particles that may, for exemplary purposes, ricochet from the side walls of inner interlocking container 110. Suction holes 114 are slightly more central from suction holes 112 and have a slightly lower density, followed by suction holes 116 located even more centrally and with a lower density yet. Finally, suction holes 118 are most preferably most centrally located and with the lowest density. Such a density pattern enhances the air flow pattern, in turn increasing the likelihood that distributed vacuum debris collector 10 will collect all debris in its vicinity. The exact number, location and diameter of suction holes 112-118 will vary with different designs, depending one or more factors such as the available flow into suctioning device 200, the anticipated velocity and size of particulates, and the surface area required to be perforated with suction holes to facilitate appropriate collection. Consequently, a designer will determine number diameter and placement at the time of design of the entire distributed vacuum debris collector 10.

Figure 4:
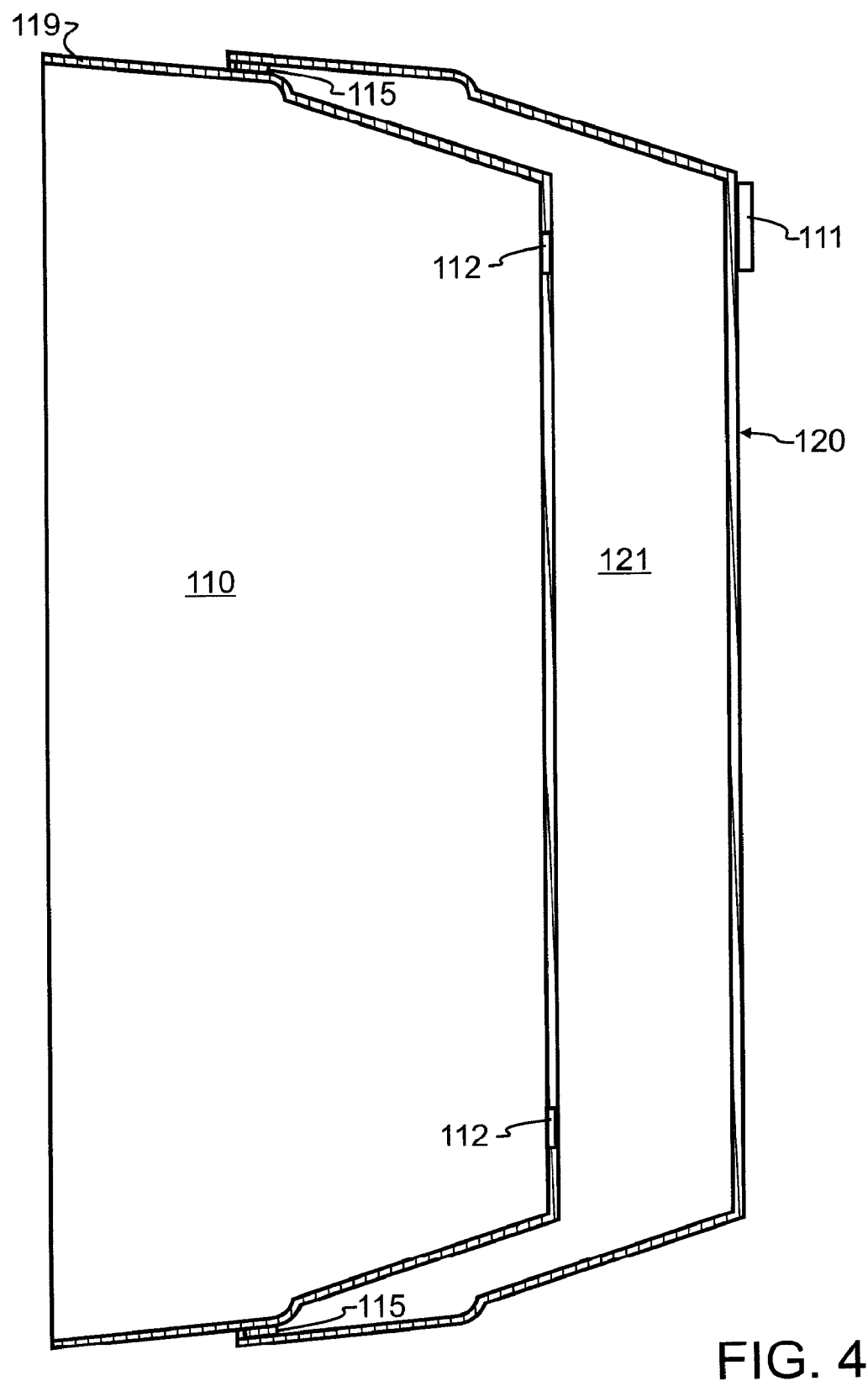
FIG. 4 illustrates the preferred embodiment debris collector from sectional view, taken along section line 4' of FIG. 1.

The arrangement of interlocking containers 110, 120 is illustrated by sectional view in FIG. 4, taken along section line 4' of FIG. 1. The specific geometry of interlocking containers 110, 120 is not critical to the invention, so long as some provision is made to form a space 121 therebetween and provide a reasonable vacuum seal 115 therebetween. In other words, the present invention is not restricted to specific geometry of these containers other than the formation of a vacuum reservoir 121 therebetween, the inlet into vacuum reservoir 121 formed by perforations 112-118 through the wall of interlocking container 110. In the preferred embodiment, side walls 119 of interlocking containers 110, 120 have a slight slope from a top. In FIG. 1, the view illustrates the open top of interlocking container 110, and the perforations 112-118 in the bottom of interlocking container 110. In this preferred embodiment, the side walls 119 extending between the open top and perforated bottom have a slight taper, permitting interlocking container 110 to nest into interlocking container 112. Perforations may optionally be provided in side walls 119, though this may undesirably add to manufacturing cost.

The line or region of interlocking seal is shown at 115 in FIG. 4, and in the preferred embodiment is formed by a suitably elastomeric gasket such as a foam weather seal, caulk, liquid rubber, adhesive, or other suitable seal. It will be understood that any location and material which forms a suitable seal and provides a vacuum reservoir 121 between interlocking containers 110, 112 is contemplated herein, and that interlocking seal 115 may be of other design or shape than a junction line or region. Furthermore, molding techniques such as blow-molding, rotational molding or other suitable technique may be utilized to form interlocking containers 110, 120 as a single unitary structure.

Figure 5:
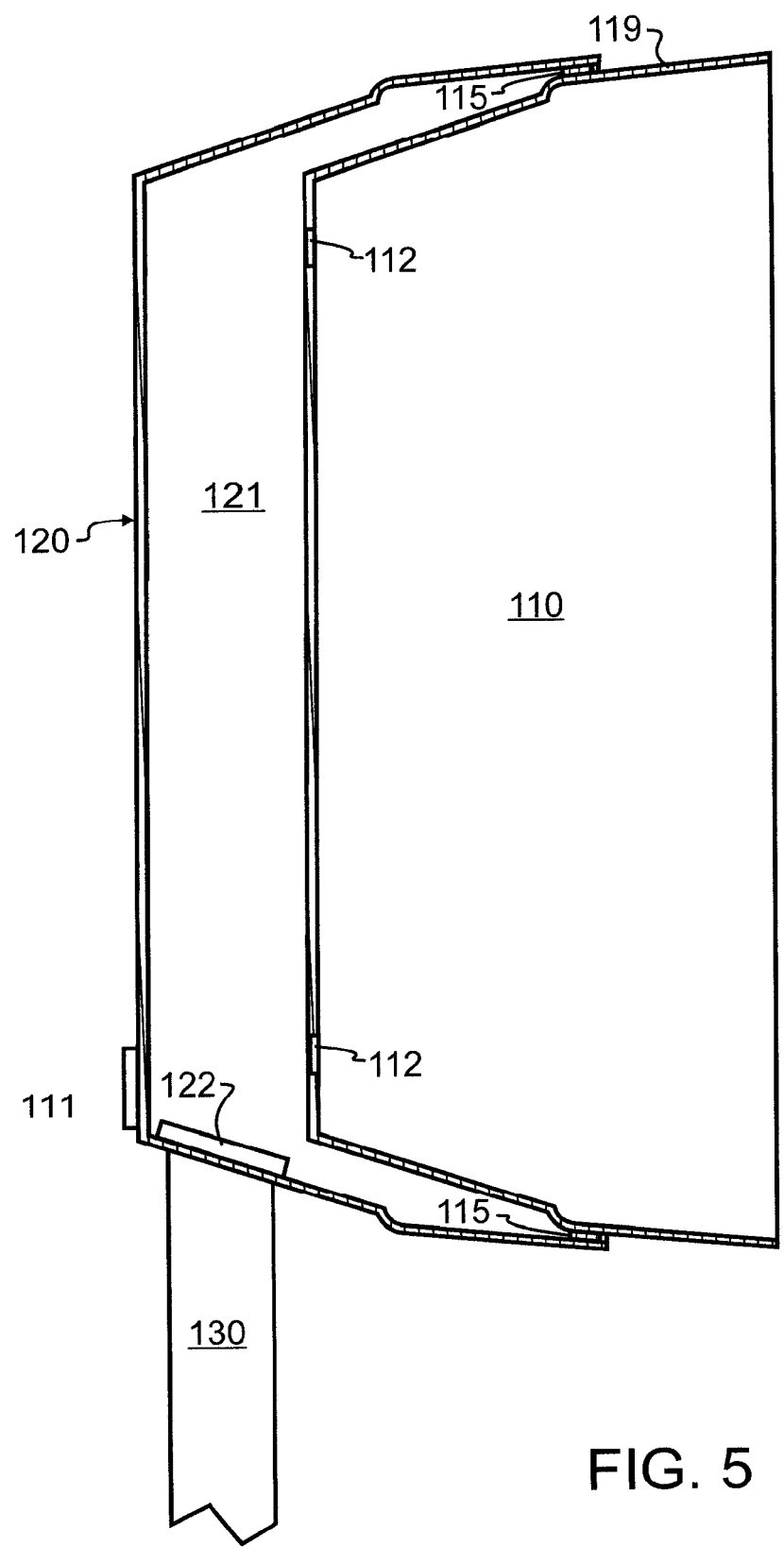
FIG. 5 illustrates the preferred embodiment debris collector in a further preferred combination with vacuum attachment 130 from sectional view, taken along section line 5' of FIG. 1.

From the sectional view of FIG. 5, a coupler 122 is provided into which attachment arm 130 engages. Coupler 122 provides fluid communication between vacuum reservoir 121 and the interior of attachment arm 130. If so desired, and in the preferred embodiment distributed vacuum debris collector 10, coupler 122 also permits attachment arm 130 to be detached from coupler 122 for storage, shipment, and also to permit the length of attachment arm 130 to be adjusted after delivery by cutting. In the preferred embodiment, attachment arm 130 comprises a PVC or similar tube which conducts air and particulate from vacuum reservoir 121 to suctioning device 200.

Figure 6A:
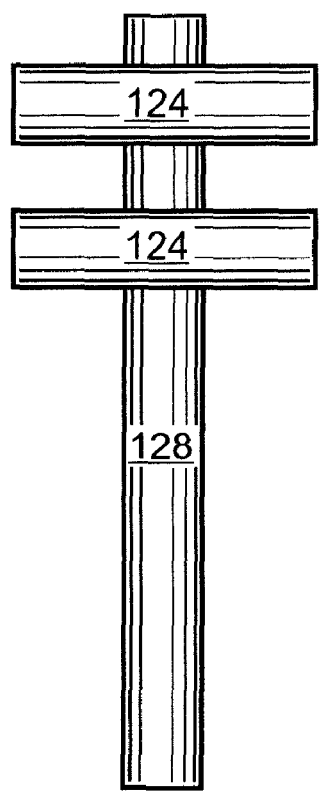
FIGS. 6a-6b illustrate an alternative embodiment inlet from front and side plan views, respectively.
Figure 6B:
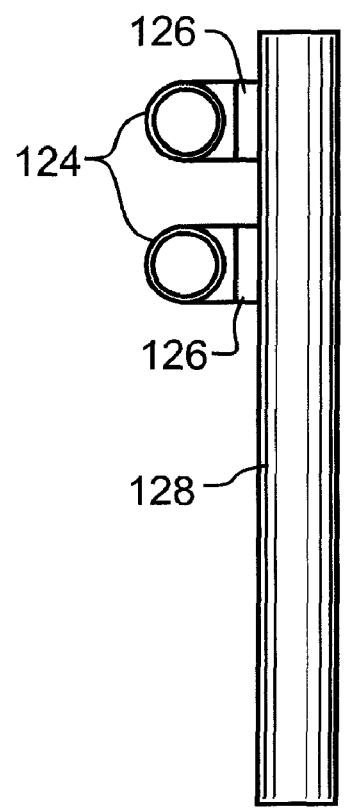
Figure 7A:
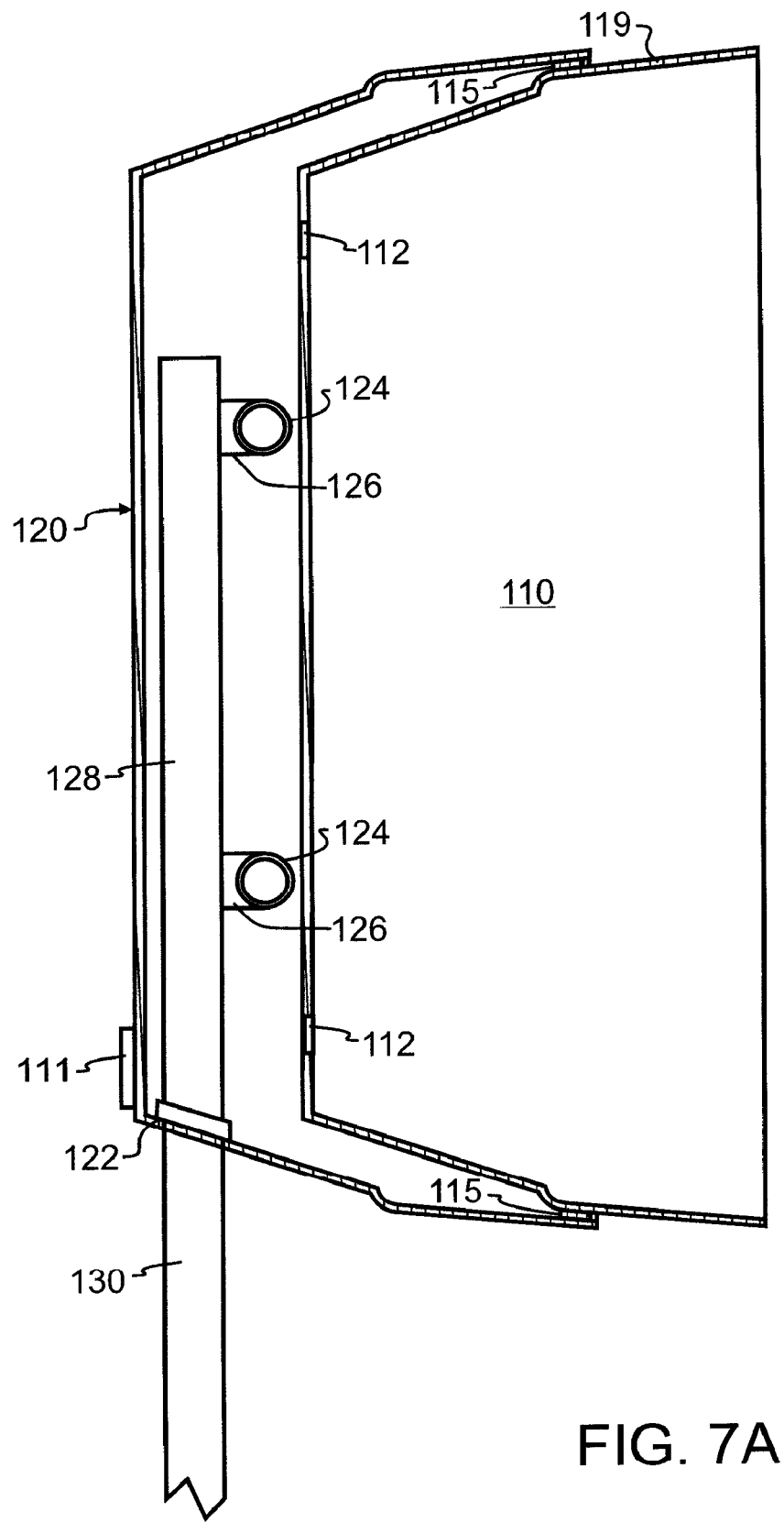
FIGS. 7a-7b illustrate the alternative embodiment inlet from FIGS. 6a-6b in a most preferred combination with the preferred embodiment debris collector of FIG. 4, connecting through the side and alternatively through the base of the debris collector, respectively, from sectional view matching that of FIG. 5.
Figure 7B:
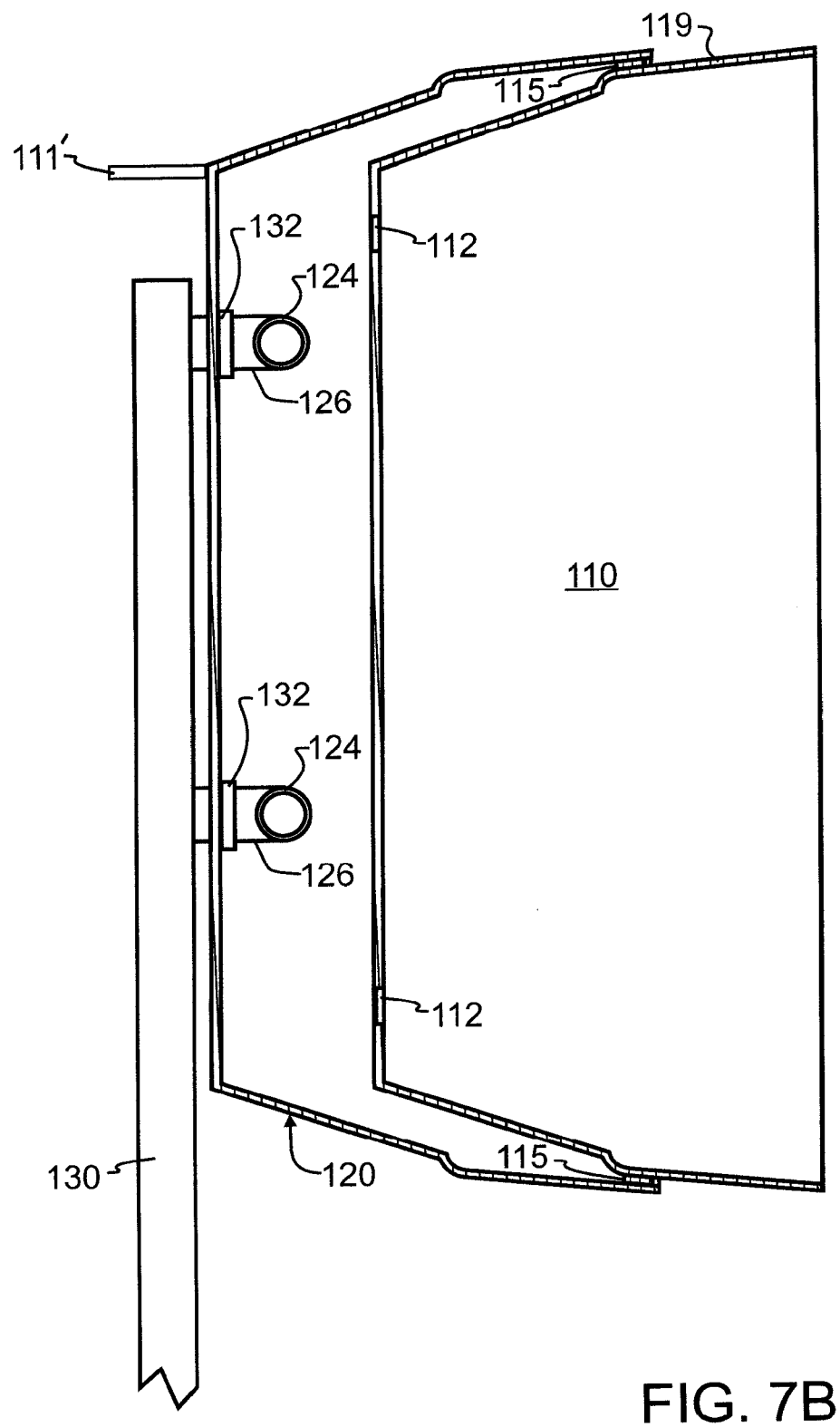

FIGS. 6a and 6b illustrate a first alternative embodiment vacuum inlet. A coupling conduit 128 has an interior passage which branches through one or more T-conduits 126 to one or more inlet conduits 124. In the embodiment illustrated, there are two T-conduits 126 that branch off or "T" with coupling conduit 128, and two inlet conduits 124, each which is in fluid communication with a T-conduit 126. Inlet conduits 124 are open at both ends, and in a region between each end coupled for fluid communication with T-conduit 126. Coupling conduit 128 may then be coupled through coupler 122 to attachment arm 130, as illustrated in FIG. 7a, and be located entirely within vacuum reservoir 121. Alternatively, coupling conduit 128 may be entirely exterior to vacuum reservoir 121, and T-conduits 126 may pass through the wall of interlocking container 120 into vacuum reservoir 121. In either alternative FIG. 7a or 7b, the open ends of inlet conduits 124 provide not one passage to attachment arm 130 at a side wall of interlocking container 120, but instead provide two or more inlets (four as illustrated). These inlets may be distributed throughout and more centrally than the single inlet at coupler 122 shown in FIG. 5. In the configuration of FIG. 7b, where attachment arm 130 runs exterior of vacuum reservoir 121, extended wall-mounting legs 111' are provided. These may take any suitable geometry, but will preferably incorporate an overhang such as commonly found in wall-mounted plaques and clocks for support upon a suitable fastener such as a nail or screw.

Figure 8:
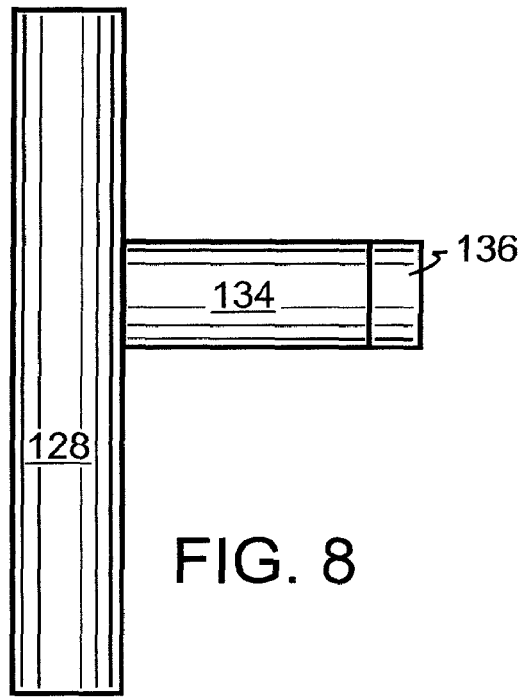
FIG. 8 illustrates an alternative embodiment T-mounted inlet from front plan view.
Figure 9A:
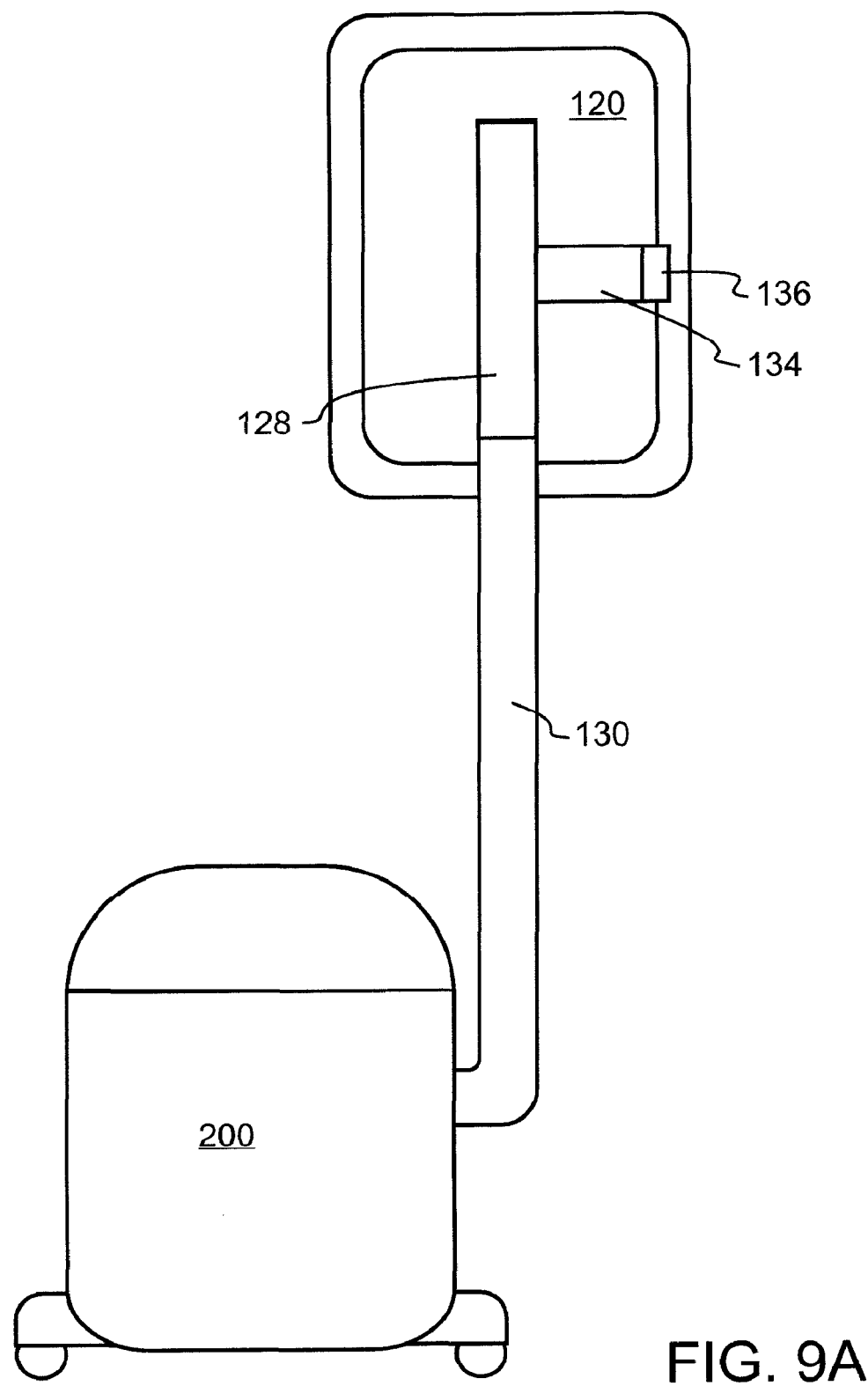
FIGS. 9a-9b illustrate the most preferred additional alternative embodiment inlet of FIG. 8 in a most preferred combination with the preferred embodiment debris collector of FIG. 4, allowing the debris collector to be used in a portrait and a landscape position, respectively, from a rear plan view.
Figure 9B:
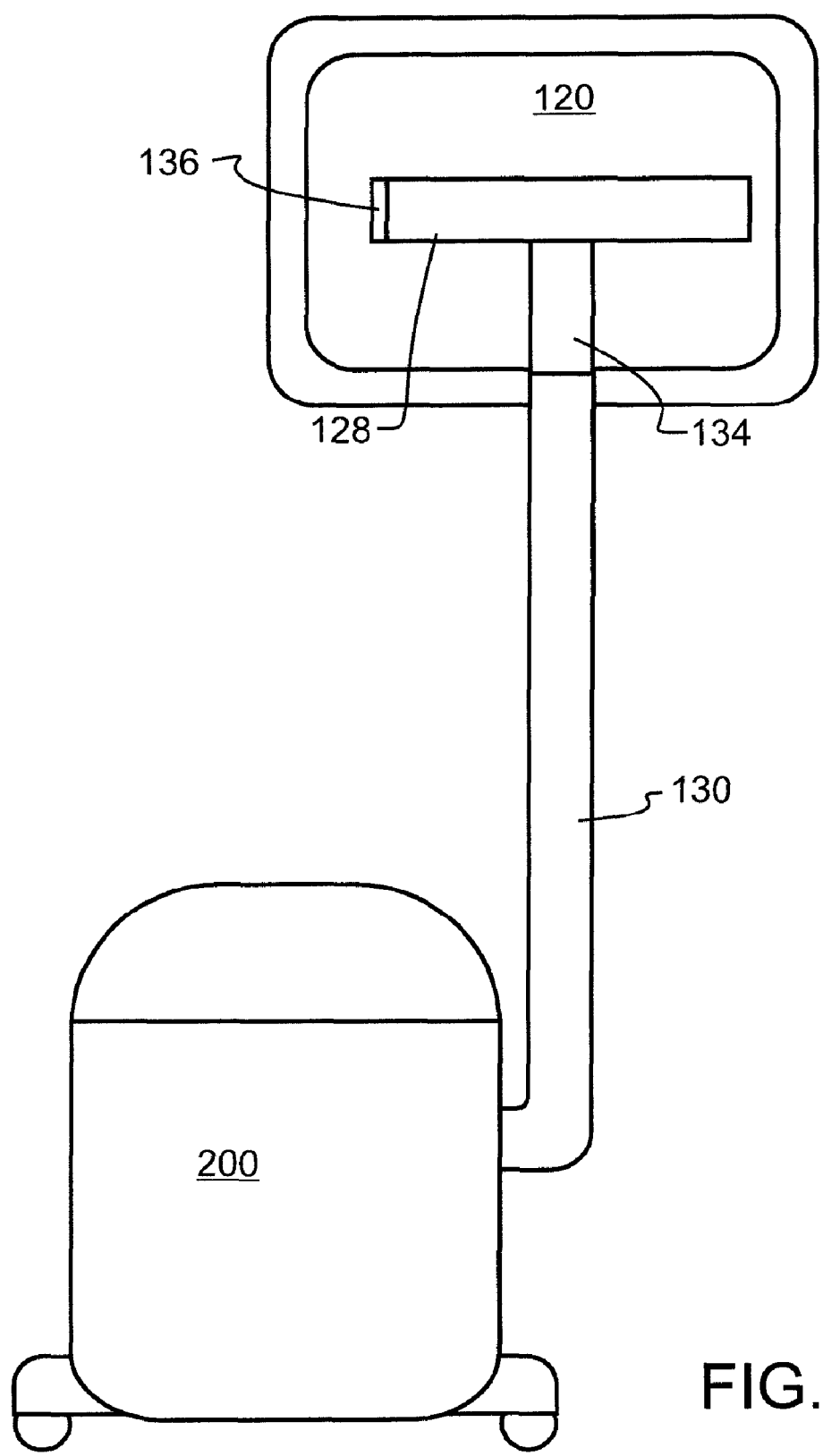

FIGS. 8, 9a and 9b illustrate a second alternative coupling with attachment arm 130. In these Figures, attachment arm 130 may couple either at coupling conduit 128 or at a second coupling conduit 134. As illustrated in FIG. 9a, attachment arm 130 is coupled to coupling conduit 128, and a cap 136 seals off second coupling conduit 134. As illustrated in FIG. 9b, attachment arm 130 is coupled to second coupling conduit 134, and a cap 136 seals off coupling conduit 128. This arrangement permits a user to determine whether distributed vacuum debris collector 10 is oriented in a "portrait" mode illustrated in FIG. 9*a*, or a "landscape" mode illustrated in FIG. 9*b*. The differing orientation only adds benefit when distributed vacuum debris collector 10 is rectangular or otherwise has dimension greater in one axis than another available orientation.

Figure 10A:
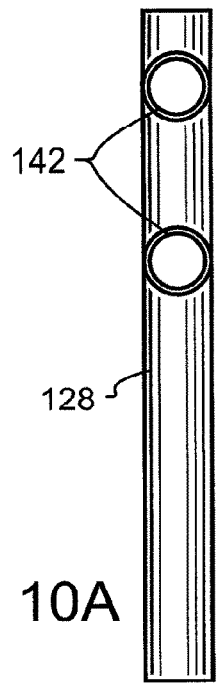
FIGS. 10a-10b illustrate a second alternative embodiment inlet geometry from front and side plan views, respectively.
Figure 10B:
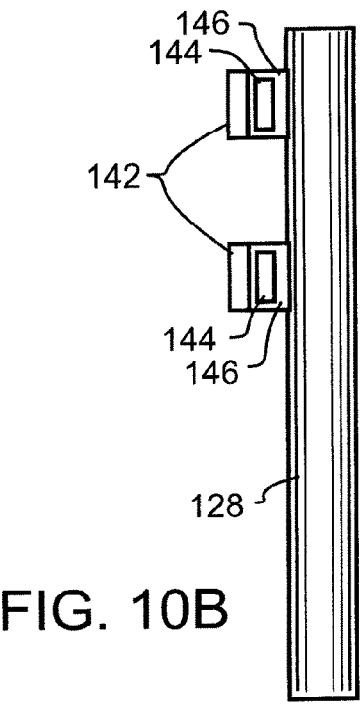
Figure 11A:
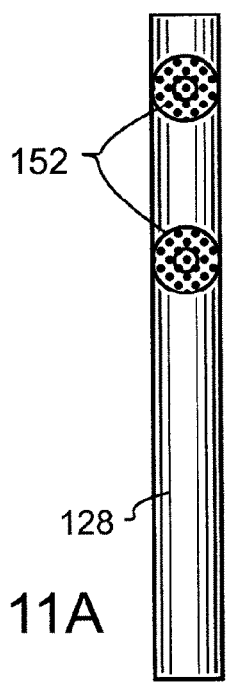
FIGS. 11a-11b illustrate an additional alternative embodiment inlet geometry from front and side plan views, respectively.
Figure 11B:
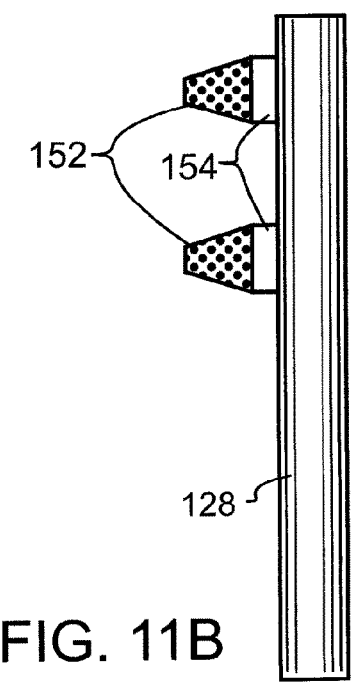

As illustrated in FIGS. 10*a* and 10*b*, a second alternative embodiment inlet geometry includes coupling conduit 128 having at least one, and as illustrated two inlet conduits 146. Slots 144 are cut through the side walls of inlet conduits 146. While a single slot 144 is visible in FIG. 10*b*, it will be appreciated that more slots may be provided as desired. Inlet conduits 146 are capped by caps 142, meaning the passage of air and particulates occurs entirely through slots 144. A third alternative embodiment inlet geometry is illustrated in FIGS. 11*a* and 11*b*. In this embodiment, coupling conduit 128 has at least one, and as illustrated two inlet conduits 154 terminating in conical screens 152. Each variant of inlet conduits illustrated herein creates different flow patterns and may be used to selectively remove different types or particle size distributions from a stream. The incorporation of a plurality of inputs assists with even flow distribution and reduces the likelihood of flow blockages forming from debris, as aforementioned.

Figure 12:
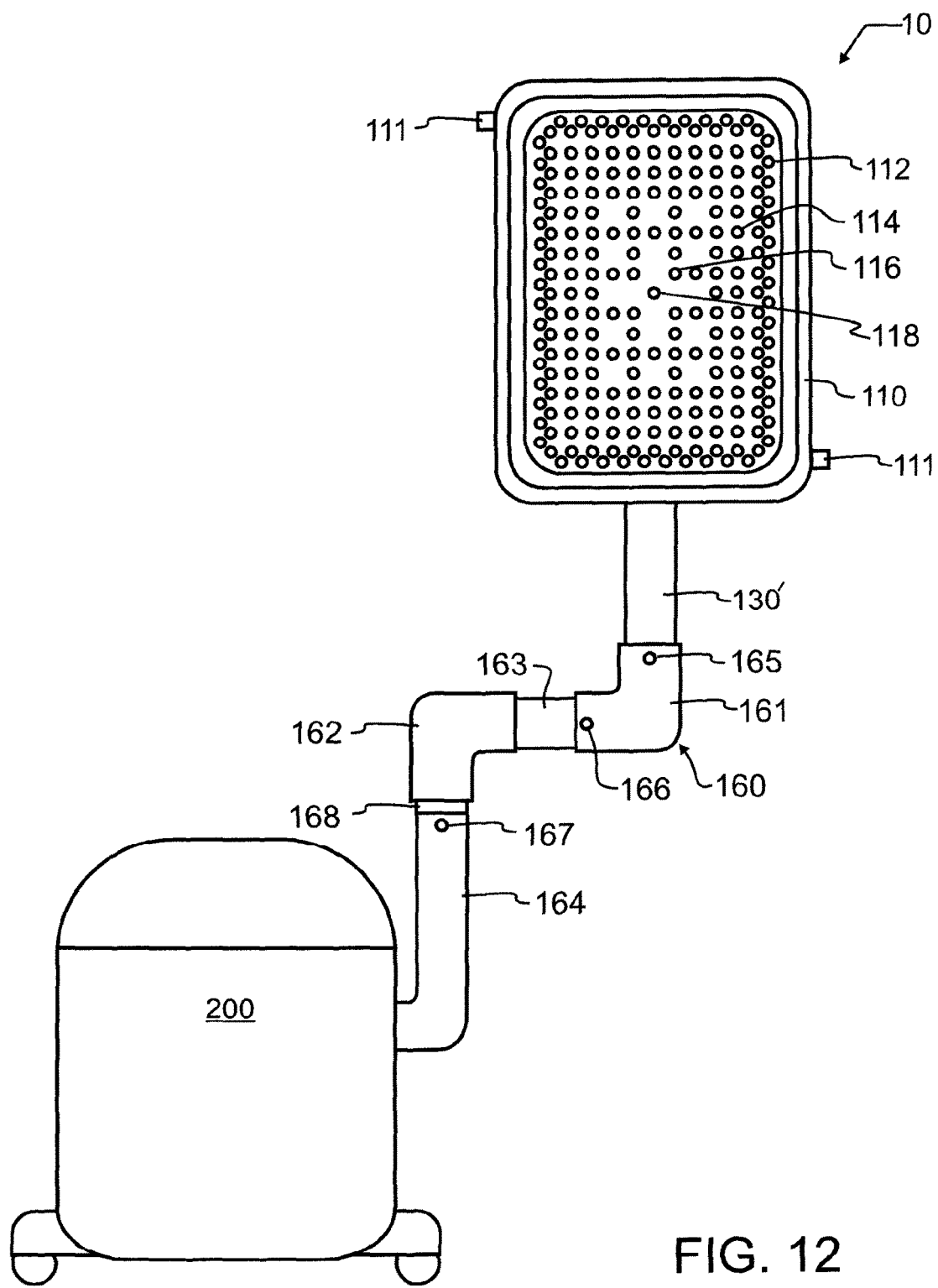
FIG. 12 illustrates an alternative embodiment attachment arm from front plan view.

FIG. 12 illustrates an alternative embodiment attachment arm from front plan view, similar to that shown in FIG. 1. An additional adjustable coupling 160 has been provided therein which permits compound movements and positioning, allowing distributed vacuum debris collector 10 to be oriented to accommodate a particular tool or work need. A pair of right angle couplers 161 and 162 are incorporated, and separated by a spacer 163 of indeterminate length. Attachment arm 130' couples into right angle coupler 161 and is held at a particular orientation with respect thereto through adjustable pin 165. This pin may take any form which permits pivotal adjustment between attachment arm 130' and right angle coupler 161. Such adjustment allows distributed vacuum debris collector 10 to be pivoted about a vertical axis. Likewise, spacer 163 couples into right angle coupler 161 and is held at a particular orientation with respect thereto through adjustable pin 166. This allows distributed vacuum debris collector 10 to be pivoted about a horizontal axis. Finally, telescopic extension 168 extends from within attachment arm 164, allowing distributed vacuum debris collector 10 to be extended vertically.

While the foregoing details what is felt to be the preferred embodiment of the invention, no material limitations to the scope of the claimed invention are intended. Further, features and design alternatives that would be obvious to one of ordinary skill in the art are considered to be incorporated herein. Exemplary alternatives considered incorporated herein, though not limited thereto, include selection of materials used to fabricate embodiments of the present invention, as well as specific physical geometries that are not essential to the overall operation of the embodiment. The scope of the invention is set forth and particularly described in the claims hereinbelow.

I claim:

1. A distributed vacuum debris collector, comprising:
a vacuum coupling for connection to a vacuum source;
a vacuum reservoir coupled through said vacuum coupling to said vacuum source and having a cupped body defined by a solid base, an inlet base spaced therefrom, and side walls rising normal from said inlet base, said solid base and said inlet base defining a chamber therebetween for containing said vacuum; wherein said vacuum reservoir further comprises: a first interlocking container having sidewalls circumscribing an air space, an opening adjacent a first termination of said sidewalls and a solid bottom distal to said opening; and a second interlocking container for nesting within said first interlocking container having sidewalls circumscribing an air space, an opening adjacent a first termination of said sidewalls and a perforated bottom distal to said opening; said vacuum reservoir defined by said first interlocking container solid bottom, side walls and said second interlocking container perforated bottom; and
inlet holes through said vacuum reservoir inlet base forming the primary inlet into said chamber having a variable density pattern with more inlet hole area per unit surface area adjacent to said side walls than at a center more distal from said side walls.

2. The distributed vacuum debris collector of claim 1, wherein said vacuum coupling further comprises a first termination inserted into and extending parallel with a vacuum hose inlet, a bend, and a vertical extension from said bend away from said first termination, said vacuum coupling suspending said vacuum reservoir.

3. The distributed vacuum debris collector of claim 2, wherein said vacuum coupling further comprises rigid tubing.

4. The distributed vacuum debris collector of claim 1, wherein said vacuum coupling further comprises a plurality of inlets distributed within said vacuum reservoir for even and consistent suction.

5. The distributed vacuum debris collector of claim 4, wherein said plurality of inlets further comprise a central conduit, said plurality of inlets protruding therefrom and spaced from each other along said central conduit.

6. The distributed vacuum debris collector of claim 5, further comprising an inlet screen over each of said plurality of inlets.

7. A vacuum debris collector having distributed vacuum coupling to a vacuum source, comprising:
a vacuum coupling for connection to a vacuum source;
a first cupped interlocking container having sidewalls circumscribing an air space, an opening adjacent a first termination of said sidewalls and a solid bottom distal to said opening;
a second cupped interlocking container for nesting within said first interlocking container having sidewalls circumscribing an air space, an opening adjacent a first termination of said sidewalls and a perforated bottom distal to said opening;
a vacuum reservoir defined by said first interlocking container solid bottom, side walls and said second interlocking container perforated bottom;
inlet holes into said vacuum reservoir; and
a plurality of inlets within said vacuum reservoir coupled through said vacuum coupling to said vacuum source for even and consistent suction.

8. The vacuum debris collector having distributed vacuum coupling of claim 7, wherein said perforated bottom further comprises inlet holes passing through said second cupped interlocking container and forming the primary inlet into said chamber, said inlet holes having a variable density pattern with more inlet hole area per unit surface area adjacent to said second cupped interlocking container side walls than at a center more distal from said second cupped interlocking container side walls.

9. The vacuum debris collector having distributed vacuum coupling of claim 7, further comprising a vacuum source, and wherein said vacuum coupling further comprises a first termination inserted into and extending parallel with a vacuum hose inlet into said vacuum source, a bend, and a vertical extension from said bend away from said first termination, said vacuum coupling suspending said vacuum reservoir.

10. The vacuum debris collector having distributed vacuum coupling of claim 9, wherein said vacuum coupling further comprises rigid tubing.

11. The vacuum debris collector having distributed vacuum coupling of claim 7, wherein said plurality of inlets further comprise a central conduit, said plurality of inlets protruding therefrom and spaced from each other along said central conduit.

12. The vacuum debris collector having distributed vacuum coupling of claim 11, further comprising an inlet screen over each of said plurality of inlets.

13. A portable vacuum debris collector, comprising:
a portable vacuum source having a vacuum hose inlet;
a vacuum reservoir having inlet holes for receiving a fluid stream with debris into said vacuum reservoir; and
a rigid vacuum coupling for connection to said vacuum hose inlet inserted into and extending parallel with said vacuum hose inlet and extending vertically therefrom, and coupling said vacuum reservoir to said vacuum source for conveying said fluid stream with debris therebetween while simultaneously suspending said vacuum reservoir from said portable vacuum source wherein said vacuum reservoir further comprises: a first cupped interlocking container having sidewalls circumscribing an air space, an opening adjacent a first termination of said sidewalls and a solid bottom distal to said opening; a second cupped interlocking container for nesting within said first interlocking container having sidewalls circumscribing an air space, an opening adjacent a first termination of said sidewalls and a perforated bottom distal to said opening; said vacuum reservoir defined by said first interlocking container solid bottom, side walls and said second interlocking container perforated bottom.

14. The portable vacuum debris collector of claim 13, wherein said vacuum reservoir further comprises a cupped geometry adjacent said inlet holes.

15. The portable vacuum debris collector of claim 13, wherein said vacuum reservoir further comprises a longer dimension and a shorter dimension angularly offset therefrom, said vacuum reservoir oriented in a first position relative to said rigid vacuum coupling with said longer dimension vertical, and oriented in a second position relative to said rigid vacuum coupling with said shorter dimension vertical.

16. The portable vacuum debris collector of claim 13, wherein said perforated bottom further comprises inlet holes passing through said second cupped interlocking container and forming the primary inlet into said chamber, said inlet holes having a variable density pattern with more inlet hole area per unit surface area adjacent to said second cupped interlocking container side walls than at a center more distal from said second cupped interlocking container side walls.

17. The portable vacuum debris collector of claim 13, wherein said rigid vacuum coupling further comprises a plurality of inlets and a central conduit, said plurality of inlets protruding therefrom and spaced from each other along said central conduit.

18. The portable vacuum debris collector of claim 13, further comprising an inlet screen over each of said plurality of inlets.

* * * * *